(12) United States Patent
Yamada et al.

(10) Patent No.: US 9,837,684 B2
(45) Date of Patent: Dec. 5, 2017

(54) ALL SOLID SECONDARY BATTERY AND METHOD OF MANUFACTURING THE SAME

(71) Applicant: Samsung Electronics Co., Ltd., Suwon-si, Gyeonggi-do (KR)

(72) Inventors: Takanobu Yamada, Yokohama (JP); Yuichi Aihara, Yokohama (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 55 days.

(21) Appl. No.: 15/041,201

(22) Filed: Feb. 11, 2016

(65) Prior Publication Data

US 2016/0248120 A1  Aug. 25, 2016

(30) Foreign Application Priority Data

Feb. 19, 2015  (JP) .................................. 2015-030760
Jun. 15, 2015  (KR) ........................ 10-2015-0084349

(51) Int. Cl.
*H01M 10/0562* (2010.01)
*H01M 10/04* (2006.01)
*H01M 10/052* (2010.01)

(52) U.S. Cl.
CPC ... *H01M 10/0562* (2013.01); *H01M 10/0468* (2013.01); *H01M 10/052* (2013.01); *H01M 2220/20* (2013.01); *H01M 2220/30* (2013.01); *H01M 2300/0068* (2013.01); *Y02E 60/122* (2013.01); *Y02P 70/54* (2015.11)

(58) Field of Classification Search
CPC ........... H01M 10/0562; H01M 10/052; H01M 10/0468
See application file for complete search history.

(56) References Cited

U.S. PATENT DOCUMENTS

| 7,824,795 | B2 | 11/2010 | Yoshida et al. |
|---|---|---|---|
| 9,246,161 | B2 | 1/2016 | Ueno et al. |
| 2007/0231704 | A1 | 10/2007 | Inda |
| 2009/0197182 | A1 | 8/2009 | Katoh |
| 2011/0123868 | A1 | 5/2011 | Kawaoka et al. |

(Continued)

FOREIGN PATENT DOCUMENTS

| JP | 2003086251 A | 3/2003 |
|---|---|---|
| JP | 2009181920 A | 8/2009 |

(Continued)

*Primary Examiner* — Stewart A Fraser
(74) *Attorney, Agent, or Firm* — Cantor Colburn LLP

(57) ABSTRACT

A solid state battery includes: a negative electrode layer including a negative electrode active material; a positive electrode layer including a positive electrode active material; and a solid electrolyte layer installed between the negative electrode layer and the positive electrode layer, wherein the solid electrolyte layer contacts the negative electrode layer and the positive electrode layer, and wherein the solid state battery satisfies Equation 1:

$$\{(V_p - V_{980})/V_p \times 100\} \leq 3\% \qquad \text{Equation 1}$$

wherein $V_p$ is a total volume of the negative electrode layer, the positive electrode layer, and the solid electrolyte layer, and $V_{980}$ is a total volume of the negative electrode layer, the positive electrode layer, and the solid electrolyte layer under the total pressure of about 980 megapascals.

20 Claims, 5 Drawing Sheets

(56) References Cited

U.S. PATENT DOCUMENTS

| | | | |
|---|---|---|---|
| 2014/0082931 A1 | 3/2014 | Nishino et al. | |
| 2015/0171431 A1* | 6/2015 | Yamada | H01M 4/70 429/163 |
| 2015/0188195 A1* | 7/2015 | Matsushita | H01M 10/0585 429/152 |
| 2015/0236373 A1* | 8/2015 | Ohtomo | C03C 3/321 264/104 |

FOREIGN PATENT DOCUMENTS

| | | |
|---|---|---|
| JP | 2009181921 A | 8/2009 |
| JP | 2012256486 A | 6/2011 |
| JP | 2012069248 A | 4/2012 |
| JP | 2012104270 A | 5/2012 |
| JP | 2014107163 A | 6/2014 |
| JP | 2014120199 A | 6/2014 |
| JP | 2014135272 A | 7/2014 |
| WO | 2008059987 A1 | 5/2008 |
| WO | 2010064288 A1 | 6/2010 |
| WO | 2012164723 A1 | 12/2012 |
| WO | 2012166529 A2 | 12/2012 |

\* cited by examiner

ALL SOLID SECONDARY BATTERY AND METHOD OF MANUFACTURING THE SAME

CROSS-REFERENCE TO RELATED APPLICATIONS

This application claims priority to and the benefit of Japanese Patent Application No. 2015-030760, filed on Feb. 19, 2015, in the Japanese Patent Office, and Korean Patent Application No. 10-2015-0084349, filed on Jun. 15, 2015, in the Korean Intellectual Property Office, the contents of which are incorporated herein in their entirety by reference.

BACKGROUND

1. Field

The present disclosure relates to a solid state battery and methods for manufacturing the solid state battery.

2. Description of the Related Art

Recently, efforts to develop batteries having high energy density and improved safety have increased in response to industrial demand. For example, lithium ion batteries have been put to practical use in automobiles, as well as information related appliances and communication devices. Safety is particularly important because an adverse event in an automobile could cause harm to a person.

Since lithium ion batteries that have been commercialized include electrolytes including combustible organic solvents, there is a possibility of an adverse event which includes combustion when there is a short circuit. Accordingly, there remains a need for an improved solid state battery using a solid state electrolyte instead of a liquid electrolyte.

SUMMARY

Provided is a solid state battery having improved stability and satisfactory battery characteristics.

Additional aspects will be set forth in part in the description which follows and, in part, will be apparent from the description.

According to an aspect of an embodiment, a solid state battery includes: a negative electrode layer including a negative electrode active material; a positive electrode layer including a positive electrode active material; and a solid electrolyte layer disposed between the negative electrode layer and the positive electrode layer, wherein the solid electrolyte layer contacts the negative electrode layer and the positive electrode layer, and the solid state battery satisfies Equation 1:

$$\{(V_p - V_{980})/V_p \times 100\%\} \leq 3\%$$  Equation 1 wherein $V_p$ is a total volume of the negative electrode layer, the positive electrode layer, and the solid electrolyte layer, and $V_{980}$ is a total volume of the negative electrode layer, the positive electrode layer, and the solid electrolyte layer under a total pressure of 980 megapascals.

Also disclosed is method of manufacturing a solid state battery, the method including: disposing a solid electrolyte layer between a negative electrode layer and the positive electrode layer to provide a laminate; pressing the laminate to consolidate the laminate, wherein the product of the pressing satisfies Equation 1:

$$\{(V_p - V_{980})/V_p \times 100\%\} \leq 3\%$$  Equation 1 wherein $V_p$ is the total volume of the negative electrode layer, the positive electrode layer, and the solid electrolyte layer after consolidation, and $V_{980}$ is a total volume the negative electrode layer, the positive electrode layer, and the solid electrolyte layer when a pressure of 980 megapascals is applied.

The solid state battery has improved safety and satisfactory battery characteristics.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
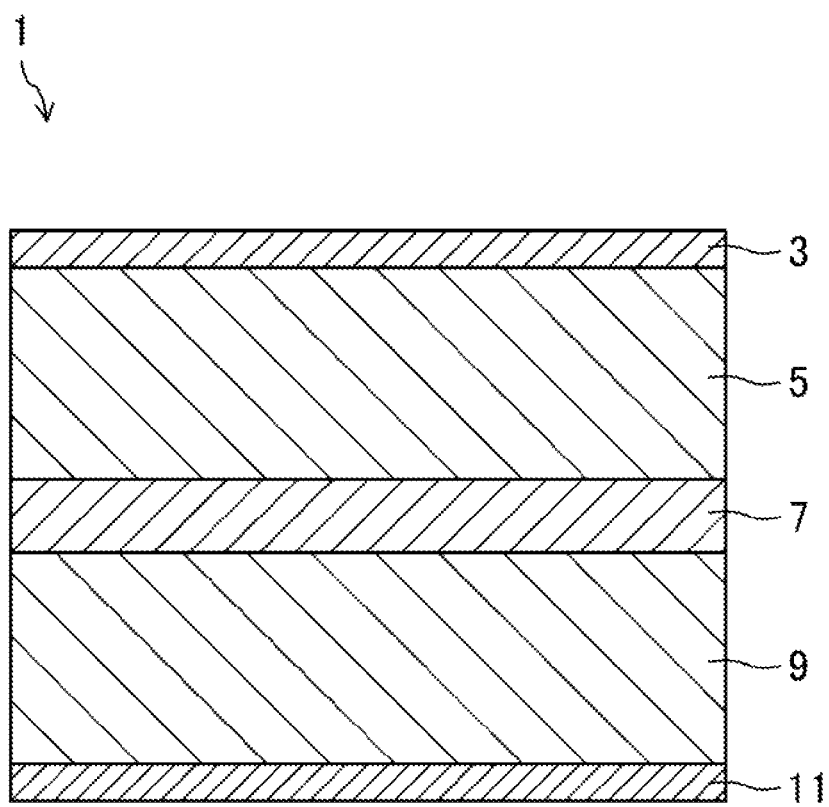
FIG. 1 is a cross-sectional view of an embodiment of a solid state battery.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Expressions such as "at least one of" when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region,"

"layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a solid state secondary battery and methods for manufacturing the all solid state secondary battery are described in further detail by referring to the attached drawings. Duplicated explanations are omitted by referring to the same marks with respect to components having the substantially same functional composition in the present disclosure and drawings.

When a short circuit occurs in a battery, there is the possibility of an adverse event, such as a fire or an explosion, which may be greatly reduced by precluding use of a combustible organic solvent in the battery. Therefore, solid state batteries may be able to provide greatly increased safety compared to lithium ion batteries which use liquid electrolytes.

However, it is difficult for a solid state battery to provide satisfactory battery characteristics. While not wanting to be bound by theory, this is understood to be because a contact between a negative electrode layer and the solid electrolyte are not sufficient, and thus a high resistance results.

To lower the cell resistance, charging and discharging may be performed while imparting an external pressure on the solid electrolyte in order to lower the resistance within the battery. However, a separate structure for imparting the external pressure would be an added cost, and its mass would reduce an energy density of the solid state battery.

A solid state battery according to an exemplary embodiment includes: a negative electrode layer including a negative electrode active material; a positive electrode layer including a positive electrode active material; and a solid electrolyte layer disposed between the negative electrode layer and the positive electrode layer, wherein the solid electrolyte layer contacts the negative electrode layer and the positive electrode layer, and wherein the solid state battery satisfies the following Equation 1:

$$\{(V_p-V_{980})/V_p\times 100\%\}\leq 3\% \qquad \text{Equation 1}$$

wherein $V_p$ is the total volume of the negative electrode layer, the positive electrode layer, and the solid electrolyte layer; and $V_{980}$ is a total volume of the negative electrode layer, the positive electrode layer, and the solid electrolyte layer under a pressure of about 980 megapascals (MPa).

For example, the Equation 1 is established when the total volume of the negative electrode layer, the positive electrode layer, and the solid electrolyte layer under a certain pressure is referred to as $V_p$, and a total volume when the negative electrode layer, the positive electrode layer, and the solid electrolyte layer are pressed by a pressure of about 980 MPa is referred to as $V_{980}$.

In the present disclosure, $\{(V_p-V_{980})/V_p\times 100\%\}$ may be called "a porosity based on $V_{980}$". $\{(V_p-V_{980})/V_p\times 100\%\}$ corresponds to an increased volume ratio of $V_p$, i.e., a total volume occupied under a certain pressure by the negative electrode layer, the positive electrode layer, and the solid electrolyte layer, with respect to $V_{980}$, i.e., a total volume occupied under a pressure of about 980 MPa by the negative electrode layer, the positive electrode layer, and the solid electrolyte layer. Since such an increase in volume is to be resultantly occupied by pores, $\{(V_p-V_{980})/V_p\times 100\%\}$ may be referred to as a relative porosity of $V_p$ with respect to $V_{980}$.

A pressure in the solid state battery may be a hydrostatic pressure. For example, the pressure may be a pressure applied by a press. The $V_p$ satisfying the Equation 1 may be obtained at a pressure of about 450 MPa or greater. That is, the $V_p$ can be the total volume of the negative electrode layer, the positive electrode layer, and the solid electrolyte layer under a pressure of about 450 MPa or greater.

The solid state battery may have a porosity which is about 2.5% or less than a porosity based on $V_{980}$. For example, the solid state battery may have a porosity which is about 2.0% or less than a porosity based on $V_{980}$. For example, the solid state battery may have a porosity which is about 1.5% or less than a porosity based on $V_{980}$. For example, the solid state battery may have a porosity which is about 1.0% or less than a porosity based on $V_{980}$.

—Composition of a Solid State Battery—

FIG. 1 is a cross-sectional view showing a solid state battery according to an exemplary embodiment disclosed in the present disclosure. This figure is schematically illustrated such that a composition for a solid state battery 1 is easily understood, and a thickness ratio of respective layers may be different from that illustrated in FIG. 1.

As shown in FIG. 1, a solid state battery 1 of the present exemplary embodiment may include a negative electrode current collector layer 11, a negative electrode layer 9, a solid electrolyte layer 7, a positive electrode layer 5, and a positive electrode current collector layer 3 sequentially installed from the bottom.

The solid electrolyte layer 7 formed between the negative electrode layer 9 and the positive electrode layer 5 is directly brought into contact with the negative electrode layer 9 and the positive electrode layer 5. The negative electrode layer 9, the solid electrolyte layer 7, and the positive electrode layer 5 are respectively comprised of powders, and are press molded. Further, although a major surface, e.g., a flat surface, of the solid state battery 1 is not particularly limited to any particular shape, examples of the flat surface shape of the solid state battery 1 may include a circular shape, and a quadrilateral shape.

The negative electrode current collector layer 11 may comprise a conductor. Examples of the negative electrode current collector layer 11 include metals such as copper (Cu), nickel (Ni), stainless steel, and a nickel coated steel sheet. For example, the negative electrode current collector layer 11 may have a thickness of about 10 micrometers (μm) to about 20 μm.

The negative electrode layer 9 may comprise a powder type negative electrode active material. For example, the negative electrode active material may have an average particle diameter range of about 5 μm to about 20 μm. For example, the negative electrode layer 9 may include the negative electrode active material such that it is contained within negative electrode layer in an amount of about 60% by weight to about 95% by weight, based on a total weight of the negative electrode layer. The negative electrode layer 9 may additionally include a binder or powder type solid electrolyte material, and a conductive material, which do not cause unduly adverse chemical reactions with the solid electrolyte layer 7.

Although well known various materials may be used as the negative electrode active material, examples of the negative electrode active material may include a carbonaceous active material, a metal active material, or an oxide active material. Examples of the carbonaceous active material may include a graphite, such as an artificial graphite or a natural graphite, and an amorphous carbon such as a hard carbon or a soft carbon. Examples of the metal active material may include lithium (Li), indium (In), aluminum (Al), silicon (Si), or tin (Sn). Examples of the oxide active material may include $Nb_2O_5$, $Li_4Ti_5O_{12}$, or SiO. These negative electrode active materials may be used alone or in a combination thereof. For example, although thickness of the negative electrode layer 9 is not particularly limited, the negative electrode layer 9 may have a thickness range of about 50 μm to about 300 μm.

For example, although the solid electrolyte layer 7 is comprised of a powder type solid electrolyte, the solid electrolyte may have an average particle diameter range of about 1 μm to about 10 μm. Examples of the solid electrolyte may include a sulfide-based solid electrolyte including at least lithium (Li), phosphorous (P), and sulfur (S). Examples of the sulfide-based solid electrolyte may include $Li_2S$—$P_2S_5$. Examples of the sulfide-based solid electrolyte include those which provide suitable lithium ion conductivity, and include a sulfide such as $SiS_2$, $GeS_2$, or $B_2S_3$, in addition to $Li_2S$—$P_2S_5$. For example, although thickness of the solid electrolyte layer 7 is not particularly limited, the solid electrolyte layer 7 may have a thickness range of about 10 μm to about 200 μm.

Further, examples of the solid electrolyte may include an inorganic solid electrolyte to which $Li_3PO_4$, halogen, or halogen compound can be added.

$Li_2S$—$P_2S_5$ may be obtained by heating $Li_2S$ and $P_2S_5$ to a melting temperature or greater, and mixing both $Li_2S$ and $P_2S_5$ at a predetermined ratio in melted state to form a mixture, maintaining the mixture for a predetermined time, and rapidly cooling the mixture. $Li_2S$—$P_2S_5$ may also be obtained by treating powders of $Li_2S$ and $P_2S_5$ according to a mechanical milling process. $Li_2S$ and $P_2S_5$ can be mixed at a molar ratio of about 50:50 to about 80:20, preferably about 60:40 to about 75:25.

The positive electrode layer 5 includes a powder type positive electrode active material. For example, the positive electrode active material may have an average particle diameter range of about 2 μm to about 10 μm. For example, the positive electrode layer 5 may include the positive electrode active material within an amount of about 65% by weight to about 95% by weight, based on a total weight of the positive electrode layer. The positive electrode layer 5 may additionally include a binder or a powder type solid electrolyte material, or a conductive material that does not cause an unduly undesirable chemical reaction with the solid electrolyte layer 7. Examples of the positive electrode active material may include a material that is capable of reversibly performing intercalation or deintercalation of lithium ions. Examples of the positive electrode active material may include a lithium cobalt oxide (LCO), a lithium nickel oxide, a lithium nickel cobalt oxide, a lithium nickel cobalt aluminum oxide (NCA), a lithium nickel cobalt manganese oxide (NCM), a lithium manganese oxide, a lithium iron phosphorous oxide, nickel sulfide, copper sulfide, sulfur, an oxide, or a vanadium oxide. Such positive electrode active materials may be used in alone or in a combination thereof.

Examples of the positive electrode active material include a complex oxide of lithium with a metal such as cobalt, manganese, nickel, or combination thereof. Specific examples of the positive electrode active material may include a compound represented by a formula selected from: $Li_aAl_{1-b}B'_bD_2$ (wherein, $0.90 \leq a \leq 1$ and $0 \leq b \leq 0.5$); $Li_aE_{1-b}B'_bO_{2-c}D_c$ (wherein, $0.90 \leq a \leq 1$, $0 \leq b \leq 0.5$, and $0 \leq c \leq 0.05$); $LiE_{2-b}B'_bO_{4-c}D_c$ (wherein, $0 \leq b \leq 0.5$ and $0 \leq c \leq 0.05$); $Li_aNi_{1-b-c}Co_bB'_cD_\alpha$ (wherein, $0.90 \leq a \leq 1$, $0 \leq b \leq 0.05$, $0 \leq c \leq 0.05$, and $0 < \alpha \leq 2$); $Li_aNi_{1-b-c}Co_bB'_cO_{2-\alpha}F'_\alpha$ (wherein, $0.90 \leq a \leq 1$, $0 \leq b \leq 0.05$, $0 \leq c \leq 0.05$, and $0 < \alpha < 2$); $Li_aNi_{1-b-c}Co_bB'_cO_{2-\alpha}F'_2$ (wherein, $0.90 \leq a \leq 1$, $0 \leq b \leq 0.05$, $0 \leq c \leq 0.05$, and $0 < \alpha < 2$); $Li_aNi_{1-b-c}Mn_bB'_cD_\alpha$ (wherein, $0.90 \leq a \leq 1$, $0 \leq b \leq 0.05$, $0 \leq c \leq 0.05$, and $0 < \alpha \leq 2$); $Li_aNi_{1-b-c}Mn_bB'_cO_{2-\alpha}F'_\alpha$ (wherein, $0.09 \leq a \leq 1$, $0 \leq b \leq 0.05$, $0 \leq c \leq 0.05$, and $0 < \alpha < 2$); $Li_aNi_{1-b-c}Mn_bB'_cO_{2-\alpha}F'_2$ (wherein, $0.90 \leq a \leq 1$, $0 \leq b \leq 0.05$, $0 \leq c \leq 0.05$, and $0<\alpha<2$); $Li_aNi_bE_cG_dO_2$ (wherein, $0.90 \le a \le 1$, $0 \le b \le 0.9$, $0 \le c \le 0.5$, and $0.001 \le d \le 0.1$); $Li_aNi_bCo_cMn_dG_eO_2$ (wherein, $0.90 \le a \le 1$, $0 \le b \le 0.9$, $0 \le c \le 0.5$, $0 \le d \le 0.5$, and $0.001 \le e \le 0.1$); $Li_aNiG_bO_2$ (wherein, $0.90 \le a \le 1$ and $0.001 \le b \le 0.1$); $Li_aCoG_bO_2$ (wherein, $0.90 \le a \le 1$ and $0.001 \le b \le 0.1$); $Li_aMnG_bO_2$ (wherein, $0.90 \le a \le 1$ and $0.001 \le b \le 0.1$); $Li_aMn_2G_bO_4$ (wherein, $0.90 \le a \le 1$ and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein, $0 \le f \le 2$); $Li_{(3-f)}Fe_2(PO_4)_3$ (wherein, $0 \le f \le 2$); and $LiFePO_4$.

In the foregoing formulas, A is Ni, Co, Mn, or a combination thereof; B' is Al, Ni, Co, Mn, Cr, Fe, Mg, Sr, V, a rare earth element, or a combination thereof; D is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof.

Examples of the positive electrode active material may include a lithium salt of a transition metal oxide having a layered rock salt structure, wherein the "rock salt structure" is a sodium chloride type structure that is a type of crystal structure, and refers to a structure in which face-centered cubic lattices formed by cations and anions have only halves of unit lattice corners disposed against one another. Examples of the positive electrode active material may include a lithium salt of ternary transition metal oxide represented by $Li_{1-x-y-z}Ni_xCo_yAl_zO_2$ (NCA) or $Li_{1-x-y-z}Ni_xCo_yMn_zO_2$ (NCM) ($0<x<1$, $0<y<1$, $0<z<1$, and $x+y+z<1$).

Examples of the positive electrode active material may include a compound on the surface of which a coating layer is formed, and a mixture of the compound and a compound having the coating layer. Examples of the coating layer may include a coating element compound such as an oxide or a hydroxide of the coating element, an oxyhydroxide of coating element, an oxycarbonate of coating element, and a hydroxy carbonate of the coating element. The compound forming the coating layer may be amorphous or crystalline. Examples of the coating element included in the coating layer may include Mg, Al, Co, K, Na, Ca, Si, Ti, V, Sn, Ge, Ga, B, As, Zr, and a mixture thereof. A coating layer forming process may include coating the element on the compounds by a method that does not have an undesirable influence on physical properties of the positive electrode active material, e.g., a spray coating method, or a dipping method. The coating layer forming process may comprise any suitable coating method, and detailed description of the coating method, the details of which may be determined by one of skill in the art without undue experimentation, has been omitted for clarity.

Examples of the conducting material for a positive electrode layer may include graphite, carbon black, acetylene black, Ketjen black, carbon fibers, or a metal powders. The positive electrode layer may further include a solid electrolyte. A known suitable solid electrolyte may be used as the solid electrolyte for the positive electrode layer without any limitation. Specific examples of the solid electrolyte for the positive electrode layer may include $Li_3N$, LISICON, lithium phosphorous oxynitride (LIPON), thio-LISICON ($Li_{3.25}Ge_{0.25}P_{0.75}S_4$), or $Li_2O$—$Al_2O_3$—$TiO_2$—$P_2O_5$ (LATP). Further, examples of a solid electrolyte having a high ion conductivity may include $Li_2S$—$P_2S_5$, $Li_3PS_4$, $Li_7P_3S_{11}$, $Li_6PS_5Cl$, and $Li_3PO_4$.

$Li_3PO_4$ may have an ion conductivity of about $10^{-4}$ Siemens per centimeter (S/cm) to $10^{-3}$ S/cm. $Li_7P_3S_{11}$ may have an ion conductivity of about $10^{-3}$ S/cm to $10^{-2}$ S/cm. $Li_6PS_5Cl$ may have an ion conductivity of about $10^{-4}$ S/cm to $10^{-3}$ S/cm. $Li_3PO_4$ may have an ion conductivity of about $10^{-5}$ S/cm to $10^{-4}$ S/cm.

Examples of the binder may include nonpolar resins that do not have polar functional groups. Therefore, a positive electrode layer binder can be inert to a reactive solid electrolyte, particularly to a sulfide-based solid electrolyte. Examples of the positive electrode layer binder may include a styrene based thermoplastic elastomer such as styrene-butadiene-styrene (SBS) block copolymer, a styrene-ethylene-butadiene-styrene (SEBS) block copolymer, a styrene-(styrene butadiene)-styrene block copolymer, a styrene butadiene rubber (SBR), a butadiene rubber (BR), a natural rubber (NR), isoprene rubber (IR), ethylene-propylene-diene monomer (EPDM), or a partial or complete hydride thereof. Examples of the binder additionally include polystyrene, a polyolefin, an olefin based thermoplastic elastomer, a polycycloolefin, or silicone resin. Although a thickness of the positive electrode layer 5 is not particularly limited, for example, the positive electrode layer 5 may have a thickness of about 50 μm to about 350 μm.

The positive electrode current collector layer 3 comprises an electrical conductor. For example, the positive electrode current collector layer 3 may comprise a metal, such as aluminum (Al), or stainless steel. Although a thickness of the positive electrode current collector layer 3 is not particularly limited, for example, the positive electrode current collector layer 3 may have a thickness of about 10 μm to about 20 μm.

Referring to FIG. 1, major, e.g., flat, surface areas of the negative electrode current collector layer 11, the negative electrode layer 9, the solid electrolyte layer 7, the positive electrode layer 5, and the positive electrode current collector layer 3 may be identical to one another. Alternatively, referring to FIG. 3, a flat surface area of the positive electrode layer 5 and the positive electrode current collector layer 3 may be smaller than those of the negative electrode current collector layer 11, the negative electrode layer 9, and the solid electrolyte layer 7, and the negative electrode current collector layer 11, the negative electrode layer 9, the solid electrolyte layer 7, the positive electrode layer 5, and the positive electrode current collector layer 3 may be installed such that flat surface external shapes of the positive electrode layer 5 and the positive electrode current collector layer 3 are disposed at the inner sides of those of the negative electrode current collector layer 11, the negative electrode layer 9, and the solid electrolyte layer 7. The flat surface areas of the positive electrode layer 5 and the positive electrode current collector layer 3 become smaller than those of the negative electrode current collector layer 11, the negative electrode layer 9, and the solid electrolyte layer 7 such that, when the negative electrode layer 9, the solid electrolyte layer 7, and the positive electrode layer 5 are pressed, they are prevented from protruding toward the outer side of the positive electrode layer 5 to make it difficult to generate a short circuit.

In a solid state battery 1 according to an exemplary embodiment, when a total volume of the negative electrode layer 9, the positive electrode layer 5, and the solid electrolyte layer 7 is $V_p$ and, under a hydrostatic pressure of about 980 MPa, the total volume of the negative electrode layer 9, the positive electrode layer 5, and the solid electrolyte layer 7 is $V_{980}$, $\{(V_p-V_{980})/V_p \times 100\%\} \le 3\%$ may be established. Further, in the present disclosure, $\{(V_p-V_{980})/V_p \times 100\%\}$ may be referred to as "a porosity based on $V_{980}$", and may be distinguished from a pore ratio (hereinafter, referred to as "true porosity") representing a volume portion occupied by actual pores in a material.

When forming the negative electrode layer 9, the positive electrode layer 5, and the solid electrolyte layer 7 using available methods for preparation of a lithium ion battery, $\{(V_p-V_{980})/V_p \times 100\%\}$ can become greater than about 3%. In contrast, in a solid state battery 1 according to an exemplary embodiment, since the negative electrode layer 9, the solid electrolyte layer 7, and the positive electrode layer 5 are consolidated to be $\{(V_p-V_{980})/V_p \times 100\%\} \leq 3\%$, a contact between the negative electrode active material and the solid electrolyte and a contact between the positive electrode active material and the solid electrolyte may be sufficiently provided. Therefore, during an operation of the solid state battery, even without external pressure applied to the solid state battery, an electrical resistance between the negative electrode layer 9 and the solid electrolyte layer 7, and an electrical resistance between the positive electrode layer 5 and the solid electrolyte layer 7 may be respectively maintained in a lower values. Resultantly, a solid state battery 1 according to an exemplary embodiment may exhibit enhanced battery characteristics.

Further, since a structure for imparting an external pressure to a solid state battery 1 according to an exemplary embodiment can be omitted, a product cost may be reduced. Further, a solid state battery 1 according to an exemplary embodiment may obtain a high energy density. Further, since a solid state battery 1 according to an exemplary embodiment is an all solid state battery, the solid state battery 1 may significantly lower risks such as fires compared to batteries using a combustible organic electrolytic solution.

Here, when the negative electrode layer 9, the positive electrode layer 5, and the solid electrolyte layer 7 are consolidated by applying a hydrostatic pressure of about 980 MPa or greater to total of the negative electrode layer 9, the positive electrode layer 5, and the solid electrolyte layer 7 that are formed by coating to manufacture a solid state battery 1, although a hydrostatic pressure of about 980 MPa is again applied to the solid state battery 1 after manufacturing a solid state battery 1, $\{(V_p-V_{980})/V_p \times 100\%\}=0\%$ may be established in the solid state battery 1 since the volume is not reduced.

Further, a fact that battery characteristics of the solid state battery may be improved by maintaining porosities of the negative electrode layer 9, the positive electrode layer 5, and the solid electrolyte layer 7 within appropriate ranges can be applied in the same way even in the cases where materials constituting the solid electrolyte layer 7 are varied.

That is because the materials composing the solid electrolyte can dictate a contact among solid particles, the materials can be a controlling factor determining characteristics of the solid state battery. Therefore, when $\{(V_p-V_{980})/V_p \times 100\} \leq 3\%$ is established, it may be possible for the solid electrolyte to show the same enhanced battery characteristics as in a solid state battery 1 according to an exemplary embodiment even in the solid electrolyte materials such as oxide based materials and phosphoric acid based materials, besides sulfide based materials.

Further, although a monopolar type solid state battery 1 is shown in FIG. 1, the solid state battery 1 may be a bipolar type solid state battery. Further, the monopolar type battery structure of FIG. 1 may be a structure in which a monopolar type battery is laminated several times.

Further, while the solid state battery 1 can be an all solid lithium ion secondary battery, the battery may be an all solid alkali ion secondary battery, e.g., an all solid sodium ion secondary battery.

Further, a solid state battery 1 according to an exemplary embodiment may be in a state that the solid state battery 1 is laminated and packaged in a vacuum atmosphere by a metal foil, or a plastic film. Even in this case, a solid state battery 1 according to an exemplary embodiment may exhibit excellent battery characteristics although it does not receive an external pressure. In a solid state battery 1 according to an exemplary embodiment, a pressure applied to the negative electrode layer 9, the positive electrode layer 5, and the solid electrolyte layer 7 from the outside in the atmosphere may be an atmospheric pressure or lower.

—Method for Manufacturing a Solid State Battery—

Examples of a method for manufacturing a solid state battery 1 may include methods using coating. First, powders of a positive electrode active material, a solid electrolyte, a conducting preparation, and a binder are added to an appropriate solvent, and the powders are mixed in the solvent to prepare a coating solution for the positive electrode layer 5. Subsequently, the coating solution is coated on one side of the positive electrode current collector layer 3, and the coating solution coated on the positive electrode current collector layer 3 is dried. A nonpolar solvent having a low reactivity with a sulfide based solid electrolyte is used in the process. Examples of the solvent may include aromatic hydrocarbons such as xylene, toluene, and ethyl benzene, and aliphatic hydrocarbons such as pentane, hexane, and heptanes.

Powders of a negative electrode active material, a solid electrolyte, a conducting preparation, and a binder are added to the solvent, and the powders are mixed in the solvent to prepare a coating solution for the negative electrode layer 9. Subsequently, the coating solution is coated on one side of the negative electrode current collector layer 11, and the coating solution coated on the negative electrode current collector layer 11 is dried.

Next, powders of a sulfide based solid electrolyte and a binder are added to a solvent, and the powders are mixed in the solvent to prepare an electrolyte layer coating solution. Subsequently, the coating solution is coated on one side of the negative electrode current collector layer 11, on which a negative electrode layer material is already coated, and the coating solution coated on the negative electrode layer material coated surface of the negative electrode current collector layer 11 is dried.

Such positive electrode current collector layer 3 and negative electrode current collector layer 11 are cut to appropriate sizes. Subsequently, overlapping the negative electrode current collector layer 11 and the positive electrode current collector layer 3 in such way that an electrolyte material coated surface of the negative electrode current collector layer 11 and a positive electrode layer material coated surface of the one side of the positive electrode current collector layer 3 are connected each other and then the following consolidation process is performed. Here, a resulting laminate obtained by overlapping the negative electrode current collector layer 11 and the positive electrode current collector layer 3 with each other is referred to as "battery laminate".

Figure 2:
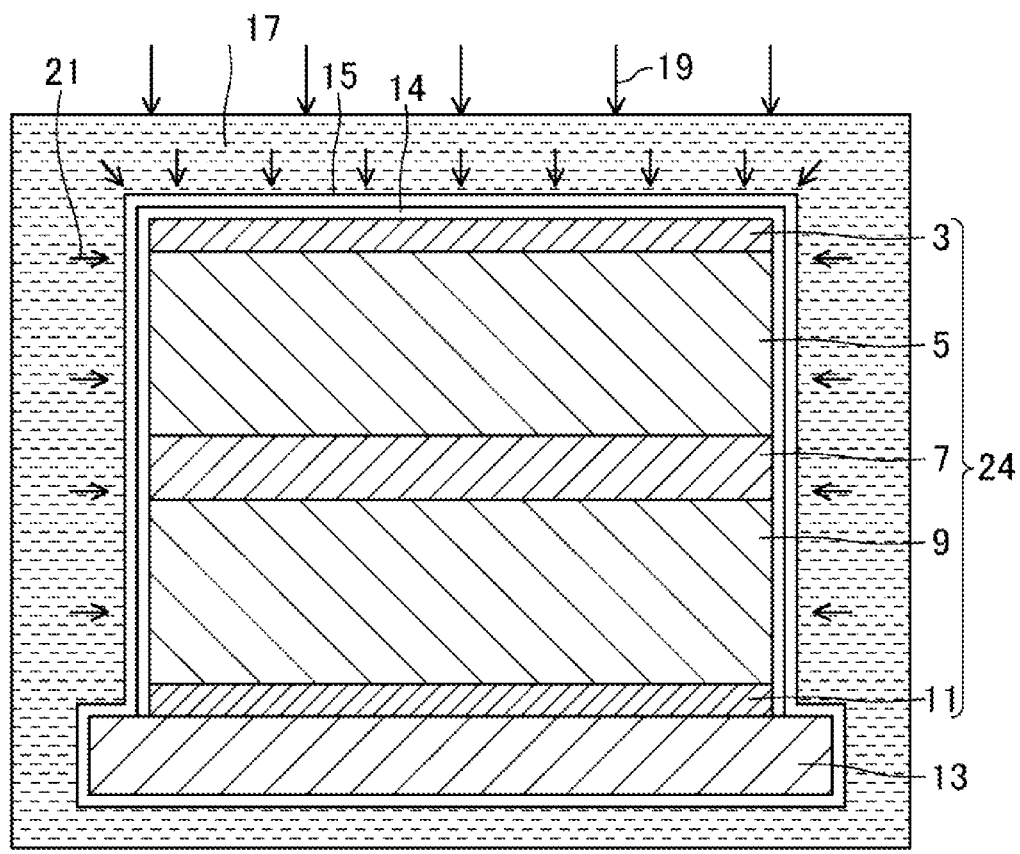
FIG. 2 is a cross-sectional view showing an embodiment of a process for consolidation of battery materials using hydrostatic pressure.

FIG. 2 is a cross-sectional view showing a process of performing consolidation of battery materials using hydrostatic pressure. As illustrated in the drawing, after disposing a battery laminate 24 on a support 13 formed of a rigid plate, the battery laminate 24 is sealed by an exterior body 14 formed of a metal foil, etc.

Subsequently, the battery laminate 24 and support 13 are sealed by a protection body 15 formed of a resin film, etc., and are disposed in a pressure medium 17 charged into a high pressure container (not illustrated). In this state, a pressure 19 is applied from the upper direction to the pressure medium 17 in the container such that the negative electrode layer 9, the solid electrolyte layer 7, and the positive electrode layer 5 are consolidated. According to this method, a desired hydrostatic pressure value 21 may be applied from the side and upper directions to the negative electrode layer 9, the solid electrolyte layer 7, and the positive electrode layer 5.

This process may reduce electric resistance of a battery since a contact between the negative electrode layer 9 and the solid electrolyte layer 7 and a contact between the positive electrode layer 5 and the solid electrolyte layer 7 are sufficiently secured. Further, since densities of the negative electrode layer 9, the solid electrolyte layer 7, and the positive electrode layer 5 may be increased, improvement in current density of the solid state battery 1 may be promoted.

In the compact process, although a hydrostatic pressure value applied from the side and upper directions to a battery laminate 24 may not be particularly limited, when the hydrostatic pressure value is about 450 MPa or higher, a porosity based on $V_{980}$ of the negative electrode layer 9, the solid electrolyte layer 7, and the positive electrode layer 5 may be maintained to about 3% or lower. This method may manufacture a solid state battery 1 representing excellent cycle retention ratio and initial discharge capacity. For example, the consolidation process may have a hydrostatic pressure value of about 500 MPa or higher applied to the battery laminate 24 from the side and upper directions. For example, the consolidation process may have a hydrostatic pressure value of about 550 MPa or higher applied to the battery laminate 24 from the side and upper directions. For example, the consolidation process may have a hydrostatic pressure value of about 600 MPa or higher applied to the battery laminate 24 from the side and upper directions. For example, the consolidation process may have a hydrostatic pressure value of about 650 MPa or higher applied to the battery laminate 24 from the side and upper directions. For example, the consolidation process may have a hydrostatic pressure value of about 700 MPa or higher applied to the battery laminate 24 from the side and upper directions.

Further, although a hydrostatic pressure applied to the battery laminate is excessively increased, it is difficult to reach a porosity of near 0, and a facility for applying the hydrostatic pressure becomes a large scale one. Therefore, a hydrostatic pressure applied to the battery laminate may be about 980 MPa or lower.

Since a hydrostatic pressure is applied to a battery laminate in a state that a support 13 is installed below a negative electrode current collector layer 11 in a process, it is possible to greatly reduce deformation of a manufactured solid state battery 1 compared to when the support 13 is not installed or when an elastic body is installed below the negative electrode current collector layer 11. Further, different hydrostatic pressures may be applied to a part of the laminate 24 that is brought into contact with the support 13 and a part of the laminate 24 that is not brought into contact with the support 13 in the consolidation process.

A support 13 used in a process may have a thickness that is capable of obtaining sufficient stiffness. For example, the support 13 may have a thickness of about 3 mm to about 5 mm. For example, the support 13 may be formed of metals. For example, the support 13 may be formed of aluminum.

After the process, a solid state battery 1 according to an exemplary embodiment may be manufactured by removing a solid state battery 1 from a pressure medium, removing a protection body 15, and separating a support 13 from the solid state battery 1.

Figure 3:
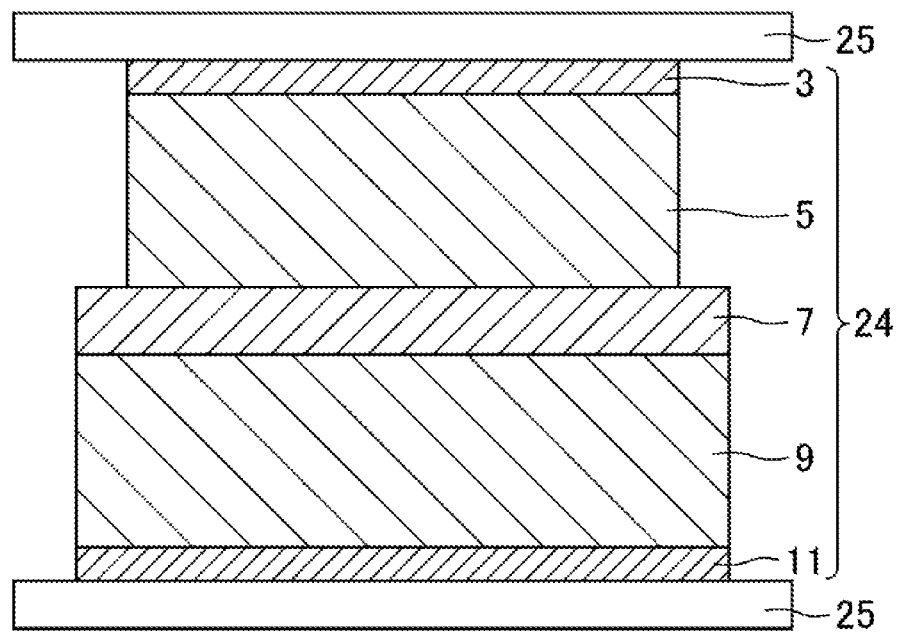
FIG. 3 is a cross-sectional view showing an embodiment of a process using uniaxial pressure to forma laminate by consolidation.

Further, although a case of applying a hydrostatic pressure to a laminate 24 is described in an exemplary embodiment, consolidation of the laminate 24 may be performed by axial press processing using a roll press, a both sided press, etc., as illustrated in FIG. 3. When performing axial press processing, the positive electrode layer 5 and the positive electrode current collector 3 may be disposed such that flat surface areas of the positive electrode layer 5 and the positive electrode current collector layer 3 may be smaller than those of the solid electrolyte layer 7, the negative electrode layer 9, and the negative electrode current collector layer 11, and flat surface profiles of the positive electrode layer 5 and the positive electrode current collector layer 3 are disposed within the inner area of flat surface profiles of the solid electrolyte layer 7, the negative electrode layer 9, and the negative electrode current collector layer 11.

For example, a pressure applied to the laminate 24 by the press may be about 450 MPa or higher. For example, a pressure applied to the laminate 24 by the press may be about 500 MPa or higher. For example, a pressure applied to the laminate 24 by the press may be about 550 MPa or higher. For example, a pressure applied to the laminate 24 by the press may be about 600 MPa or higher. For example, a pressure applied to the laminate 24 by the press may be about 650 MPa or higher. For example, a pressure applied to the laminate 24 by the press may be about 700 MPa or higher.

For example, a pressure applied to the laminate 24 by the press may be about 980 MPa or lower.

The laminate 24 is sandwiched between a press 25 by this method such that the positive electrode layer 5 may be effectively prevented from being brought into contact with the negative electrode layer 9 and the negative electrode current collector layer 11 even when the positive electrode layer 5 is spread toward the outside.

Hereinafter, the solid state battery 1 and the method of manufacturing the solid state battery 1 according to exemplary embodiments of the present disclosure are described more in detail through the following Examples and Comparative Examples. However, such embodiments are provided for illustrative purposes only, and the scope of the present invention should not be limited thereto in any manner. Further, it should be understood that the present disclosure is not limited to the above descriptions since other various modifications of the present disclosure may occur to persons having ordinary knowledge in the related art of the present disclosure.

EXAMPLES

Next, examples of a solid state battery 1 according to an embodiment are described. Further, all of operations in the following Examples and Comparative Examples were performed in a dry room of a dew-point temperature of about −55° C. or lower.

Example 1

—Formation of a Positive Electrode Layer—

A LiNi$_{1/3}$Co$_{1/3}$Mn$_{1/3}$O$_2$ powder (positive electrode active material), a Li$_2$S—P$_2$S$_5$ powder (sulfide-based solid electrolyte), and a vapor grown carbon fiber powder (conducting preparation) were weighed and mixed at a weight ratio of about 60:35:5 to prepare a powder mixture. Subsequently, a xylene solution into which butadiene rubber as a binder was dissolved was added to the powder mixture such that the powder mixture included about 2% by weight of the binder with respect to the total weight of the powder mixture, and the powder mixture and the binder were mixed using a rotation-revolution mixer to prepare a coating solution of the positive electrode layer.

Subsequently, the coating solution of the positive electrode layer was coated on an aluminum foil (positive electrode current collector) having a thickness of about 12 μm using a desktop screen printer. After drying the coating solution-coated aluminum foil at a temperature condition of about 40° C. for about 10 minutes using a hot plate, the dried coating solution-coated aluminum foil was dried again in a vacuum atmosphere at about 40° C. for about 12 hours. Therefore, a positive electrode layer was formed on an aluminum foil. The positive electrode layer had a thickness of about 300 μm.

—Formation of a Negative Electrode Layer—

Next, a graphite powder (negative electrode active material), a Li$_2$S—P$_2$S$_5$ powder (sulfide-based solid electrolyte), and a vapor grown carbon fiber powder (conducting preparation) were weighed and mixed at a weight ratio of about 60:35:5 to prepare a powder mixture. Subsequently, a xylene solution into which butadiene rubber as a binder was dissolved was added to the powder mixture such that the powder mixture included about 3% by weight of the binder with respect to the total weight of the powder mixture, and the powder mixture and the binder were mixed using a rotation-revolution mixer to prepare a coating solution of the negative electrode layer. Subsequently, the coating solution of the negative electrode layer was coated on a copper foil (negative electrode current collector) having a thickness of about 10 μm using a desktop screen printer.

After drying the coating solution-coated copper foil at a temperature condition of about 40° C. for about 10 minutes using a hot plate, the dried coating solution-coated copper foil was dried again in a vacuum atmosphere at about 40° C. for about 12 hours. Thereby, a negative electrode layer was formed on a copper foil. Subsequently, the negative electrode-formed copper foil, i.e., a negative electrode structure was rolled by using a roll press having a roll gap of about 50 μm. The negative electrode layer and the copper foil had a total thickness of about 120 μm.

—Formation of an Electrolyte Layer—

A xylene solution into which a binder was dissolved was added to a Li$_2$S—P$_2$S$_5$ powder (sulfide-based solid electrolyte), and the xylene solution and the Li$_2$S—P$_2$S$_5$ powder (sulfide-based solid electrolyte) were mixed using a rotation-revolution mixer to prepare a coating solution of the electrolyte layer.

Subsequently, the coating solution of the electrolyte layer was coated on a negative electrode structure using a desktop screen printer. After drying the negative electrode structure at a temperature condition of about 40° C. for about 10 minutes using a hot plate, the dried negative electrode structure was dried again in a vacuum atmosphere at about 40° C. for about 12 hours. Thereby, a solid electrolyte layer was formed on the negative electrode structure. After drying the solid electrolyte layer formed on the negative electrode structure, the solid electrolyte layer had a thickness of about 70 μm.

—Manufacturing of a Solid State Battery—

After punching holes respectively in a sheet shaped negative electrode structure in which a negative electrode structure solid electrolyte layer was formed and in a sheet shaped positive electrode current collector layer in which a positive electrode layer was formed using a Thomson blade, the negative electrode structure and the positive electrode current collector layer were laminated such that the solid electrolyte layer and the positive electrode layer were brought into contact with each other. In this state, vacuum laminate pack of a laminate was performed. Here, the vacuum laminate pack was performed such that top, bottom, left and right sides of the negative electrode structure solid electrolyte layer were extended as long as about 0.7 mm compared to those of the positive electrode layer at each sides.

Next, after putting the laminate on an aluminum plate (support) having a thickness of about 3 mm, the vacuum laminate pack was performed on the laminate including the support. The laminate was settled down into a pressure medium as shown in FIG. 2 to perform hydrostatic pressure treatment (consolidation process) on the laminate at about 455 MPa. Thereby, a single cell (single battery) as a solid state battery 1 was manufactured.

Examples 2 to 5

Solid batteries according to Examples 2 to 5 were manufactured by the same method as in Example 1 except for the consolidation process. In a consolidation process, a hydrostatic pressure of about 490 MPa was applied in Example 2, a hydrostatic pressure of about 525 MPa was applied in Example 3, a hydrostatic pressure of about 675 MPa was applied in Example 4, and a hydrostatic pressure of about 980 MPa was applied in Example 5.

Comparative Examples 1 to 6

Solid batteries according to Comparative Examples 1 to 6 were manufactured by the same method as in Example 1 except for the consolidation process. A consolidation process was not performed in Comparative Example 1. Further, a hydrostatic pressure of about 75 MPa was applied in Comparative Example 2, a hydrostatic pressure of about 150 MPa was applied in Comparative Example 3, a hydrostatic pressure of about 225 MPa was applied in Comparative Example 4, and a hydrostatic pressure of about 375 MPa was applied in Comparative Example 5.

—Measurement of Porosity Based on V$_{980}$—

First, after punching a hole having a diameter of about 13 mm in layers of a negative electrode layer, a solid electrolyte layer, and a positive electrode layer in a solid state battery, thickness values and weight values of films were respectively measured using a thickness meter and a scale. Then, V$_p$, a total volume of a negative electrode layer, a solid electrolyte layer, and a positive electrode layer in a solid state battery, was calculated from the measured values.

Subsequently, a laminate consisting of a negative electrode current collector layer, a negative electrode layer, a solid electrolyte layer, a positive electrode layer, and a positive electrode current collector layer was put on an aluminum sheet (support) having a thickness of about 3 mm in such a way that the negative electrode current collector layer was directed to the downward side. The laminate was disposed into a pressure medium in a vacuum laminate pack state as illustrated in FIG. 2. Next, a pressure was applied from the upper side into the pressure medium such that a hydrostatic pressure of about 980 MPa was applied to the laminate. Thereafter, after taking the laminate out of the vacuum laminate pack, a hole having a diameter of about 13 mm was punched in layers of a negative electrode layer, a solid electrolyte layer, and a positive electrode layer in the laminate and thickness values and weight values of films were respectively measured. Then, $V_{980}$, a total volume of a negative electrode layer, a solid electrolyte layer, and a positive electrode layer in a solid state battery, was calculated from the measured values.

From the measured values obtained in the above, a porosity based on $V_{980}$ was obtained by calculating a value of $\{(V_p-V_{980})/V_p \times 100\%\}$.

—Measurement of Cycle Retention Ratios—

After disposing a solid state battery in a thermostat of about 25° C., and charging and discharging processes were performed at a current density of about 0.5 mA/cm² in a voltage range of about 4 V to about 2.5 V. Cycle retention ratios were calculated as ratios of discharge capacities of the $50^{th}$ cycle to discharge capacities of the first cycle of 100%.

—Cell Resistance—

After disposing a solid state battery in a thermostat of about 25° C., and charging and discharging processes were performed at a current density of about 0.5 mA/cm² in a voltage range of about 4 V to about 2.5 V. Measurements of impedance (cell resistance) values were performed in a charging state of the fifth cycle.

—Initial Discharge Capacity—

After disposing a solid state battery in a thermostat of about 25° C., and charging and discharging processes were performed at a current density of about 0.5 mA/cm² in a voltage range of about 4 V to about 2.5 V. Ratios of initial discharge capacities were calculated when an initial discharge capacity of solid state battery of Example 5 was regarded as 100%, wherein consolidation was performed using a hydrostatic pressure of about 980 MPa in Example 5.

—Measurement Results—

Measurement results in the solid batteries according to Examples 1 to 5, and Comparative Examples 1 to 6 were represented in the following Table 1.

TABLE 1

| | Hydrostatic pressure [MPa] | Porosity [%] | Cycle retention ratio [%] | Cell resistance [Ω] | Initial discharge capacity [%] |
|---|---|---|---|---|---|
| Comparative Example 1 | 0 | 32.4 | 0.0 | | 0 |
| Comparative Example 2 | 75 | 16.5 | 23.4 | 816 | 28 |
| Comparative Example 3 | 150 | 13.2 | 40.7 | 654 | 42 |
| Comparative Example 4 | 225 | 10.6 | 55.3 | 382 | 52 |
| Comparative Example 5 | 300 | 7.7 | 66.8 | 243 | 64 |
| Comparative Example 6 | 375 | 6.0 | 73.5 | 198 | 69 |
| Example 1 | 455 | 3.0 | 95.0 | 40 | 95 |
| Example 2 | 490 | 1.8 | 96.3 | 38 | 96 |
| Example 3 | 525 | 1.2 | 96.8 | 31 | 98 |
| Example 4 | 675 | 0.6 | 97.0 | 29 | 99 |
| Example 5 | 980 | 0.0 | 98.0 | 27 | 100 |

Figure 4:
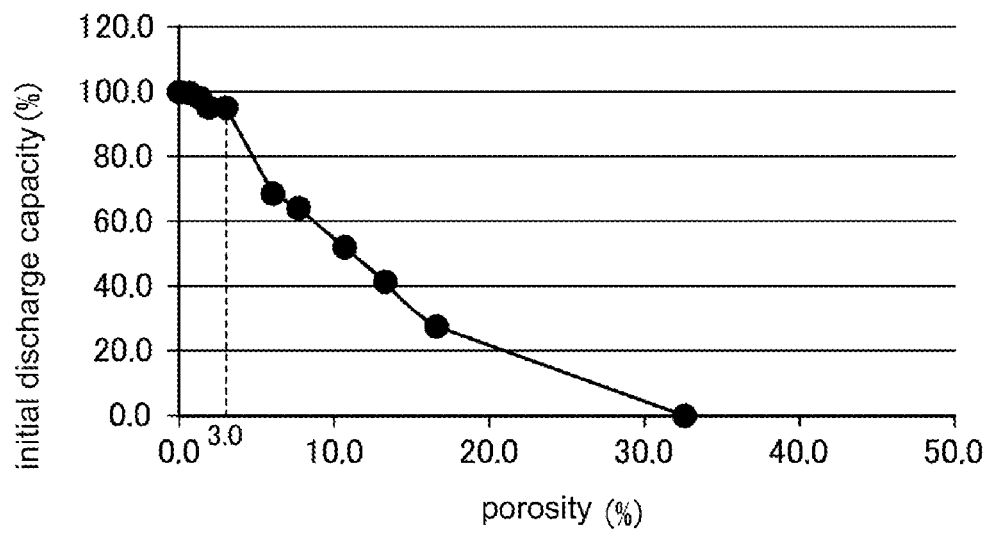
FIG. 4 is a graph of normalized initial discharge capacity (percent, %) versus porosity (%) showing a relation between a ratio of the initial discharge capacity of a solid state battery to an initial discharge capacity of the solid state battery when the solid-state battery is pressed by a hydrostatic pressure of about 980 megapascals (MPa), regarded as 100%, wherein the porosity is based on a porosity of the solid-state battery at a hydrostatic pressure of about 980 MPa ($V_{980}$)
Figure 5:
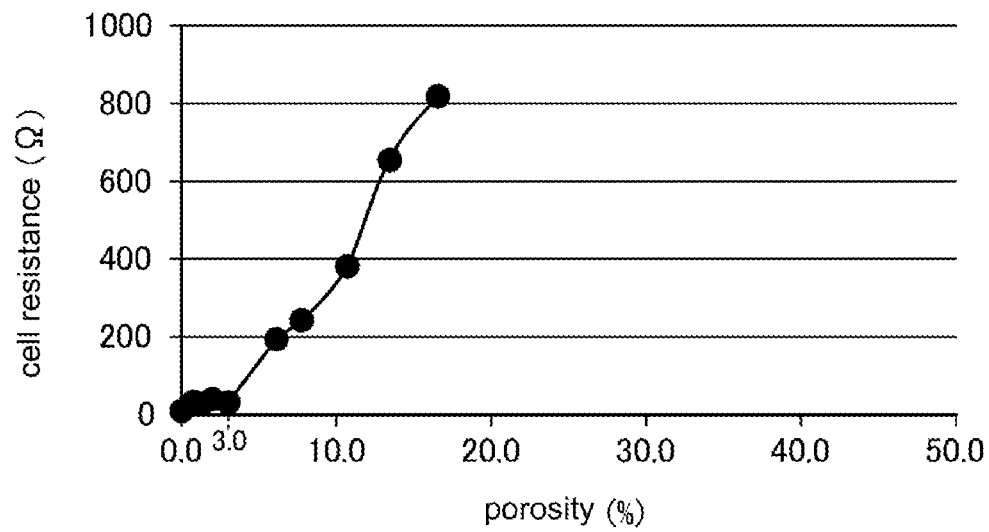
FIG. 5 is a graph of cell resistance (ohms, Ω) versus porosity (%) showing a relation between a cell resistance and a porosity based on $V_{980}$, wherein a volume of the solid state battery is determined when the solid state battery is pressed by a hydrostatic pressure of about 980 MPa.
Figure 6:
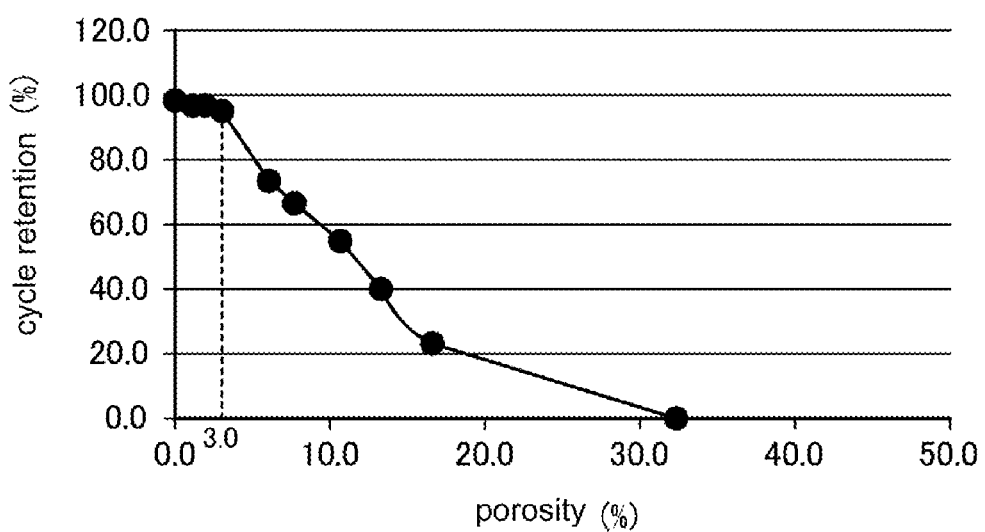
FIG. 6 is a graph of cycle retention (%) versus prostate (%) showing a relation between a cycle retention ratio and a porosity based on $V_{980}$, wherein a volume of the solid state battery is determined when the solid state battery is pressed by the hydrostatic pressure of about 980 MPa.

Further, a relation between an initial discharge capacity and a porosity based on $V_{980}$ is illustrated in FIG. 4, a relation between a cell resistance and a porosity based on $V_{980}$ is illustrated in FIG. 5, and a relation between a cycle retention ratio and a porosity based on $V_{980}$ is illustrated in FIG. 6.

It was confirmed from the results of Examples 1 to 5 represented by Table 1 that the porosity based on $V_{980}$ was about 3% or lower when performing the consolidation process at a hydrostatic pressure of about 455 MPa or higher.

Further, it was confirmed as illustrated in FIG. 5 that the cell resistance became a substantially low value when the porosity based on $V_{980}$ was about 3% or lower compared to when the porosity based on $V_{980}$ was about higher than 3%.

Further, it was confirmed as illustrated in FIGS. 4 and 6 that Examples 1 to 5, wherein porosities based on $V_{980}$ were about 3% or lower, shows larger initial discharge capacities over Comparative Examples 1 to 6, and the discharge capacities of the Examples 1 to 5 were well maintained even after performing 50 cycles of the charging and discharging processes.

Further, it was confirmed from the results for Comparative Examples 1 to 6 that, as the hydrostatic pressure values of consolidation treatment are decreased, the cell resistance values are increased, the initial discharge capacities are decreased, and the cycle retention ratios are lowered.

As described above, solid batteries related to the present examples may be applied to various portable appliances or vehicles.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A solid state battery comprising:
    a negative electrode layer comprising a negative electrode active material;
    a positive electrode layer comprising a positive electrode active material;
    a solid electrolyte layer disposed between the negative electrode layer and the positive electrode layer;
    a negative electrode current collector; and
    a positive electrode current collector,
    wherein the solid electrolyte layer contacts the negative electrode layer and the positive electrode layer,
    wherein a major surface area of each of the negative electrode current collector layer, the negative electrode layer, the solid electrolyte layer, the positive electrode layer, and the positive electrode current collector are the same, or the major surface area of each of the positive electrode layer and the positive electrode current collector layer are smaller than the major surface area of each of the negative electrode current collector layer, the negative electrode layer, and the solid electrolyte layer, and
    wherein the solid state battery satisfies Equation 1:

$$\{(V_P-V_{980})/V_P \times 100\%\} \leq 3\%$$ Equation 1 wherein
- $V_p$ is a total volume of the negative electrode layer, the positive electrode layer, and the solid electrolyte layer, and
- $V_{980}$ is a total volume of the negative electrode layer, the positive electrode layer, and the solid electrolyte layer under a total pressure of about 980 megapascals.

2. The solid state battery of claim 1, wherein the pressure is a hydrostatic pressure.

3. The solid state battery of claim 1, wherein $V_p$ in Equation 1 is determined at a pressure of about 450 megapascals or greater.

4. The solid state battery of claim 1, wherein the negative electrode layer, the positive electrode layer, and the solid electrolyte layer are each a consolidated powder.

5. The solid state battery of claim 1, wherein the negative electrode layer, the positive electrode layer, and the solid electrolyte layer each comprise consolidated particles.

6. The solid state battery of claim 1, wherein the solid electrolyte layer comprises a sulfide solid electrolyte comprising lithium, phosphorous, and sulfur.

7. The solid state battery of claim 1, wherein the solid electrolyte comprises $Li_2S$—$P_2S_5$.

8. The solid state battery of claim 1, wherein a pressure applied to the negative electrode layer, the positive electrode layer, and the solid electrolyte layer is a pressure of one atmosphere or less.

9. The solid state battery of claim 1, wherein a discharge capacity at a $50^{th}$ cycle of the solid state battery is about 95% or greater than a discharge capacity at a first cycle of the solid state battery, when charged and discharged at about 25° C. and at a current density of about 0.5 milliamperes per square centimeter in a voltage range of about 4 volts to about 2.5 volts.

10. The solid state battery of claim 1, wherein a cell resistance of the solid state battery after charging at the fifth cycle is about 40 ohms or less, when charged and discharged at about 25° C. and at a current density of about 0.5 milliamperes per square centimeter in a voltage range of about 4 volts to about 2.5 volts.

11. The solid state battery of claim 1,
wherein the solid state battery satisfies Equation 1

$$\{(V_p-V_{980})/V_p \times 100\%\} \le 3\%, \text{ and} \qquad \text{Equation 1}$$

wherein an initial discharge capacity of the solid state battery is about 95% or greater of an initial discharge capacity of a solid state battery satisfying the equation $\{(V_p-V_{980})/V_p \times 100\}=0\%$,
wherein charging and discharging are performed at about 25° C. and at a current density of about 0.5 milliamperes per square centimeter in a voltage range of about 4 volts to about 2.5 volts.

12. The solid state battery of claim 1, wherein the major surface area of the positive electrode layer is smaller than the major surface area of each of the negative electrode layer and the solid electrolyte layer.

13. The solid state battery of claim 12, wherein the positive electrode layer, the negative electrode layer, and the solid electrolyte layer are each product of press consolidation.

14. The solid state battery of claim 1, wherein the solid state battery is an all solid state battery.

15. The solid state battery of claim 1, wherein the solid state battery is an alkali ion secondary battery.

16. A method of manufacturing a solid state battery, the method comprising:
providing a positive electrode current collector disposed on a positive electrode layer;
providing a negative electrode current collector disposed on a negative electrode layer;
disposing a solid electrolyte layer between the negative electrode layer and the positive electrode layer to provide a laminate, wherein a major surface area of each of the negative electrode current collector layer, the negative electrode layer, the solid electrolyte layer, the positive electrode layer, and the positive electrode current collector are the same, or the major surface area of each of the positive electrode layer and the positive electrode current collector layer are smaller than the major surface area of each of the negative electrode current collector layer, the negative electrode layer, and the solid electrolyte layer; and
pressing the laminate to consolidate the laminate, wherein the product of the pressing satisfies Equation 1:

$$\{(V_p-V_{980})/V_p \times 100\%\} \le 3\% \qquad \text{Equation 1}$$

wherein
- $V_p$ is the total volume of the negative electrode layer, the positive electrode layer, and the solid electrolyte layer after consolidation, and
- $V_{980}$ is a total volume the negative electrode layer, the positive electrode layer, and the solid electrolyte layer when a pressure of 980 megapascals is applied.

17. The method of manufacturing the solid state battery of claim 16, wherein the pressure is a hydrostatic pressure.

18. The method of manufacturing the solid state battery of claim 16, wherein the pressing the laminate comprises applying a hydrostatic pressure to the laminate,
wherein the laminate is formed on a support comprising a rigid plate, which is configured to apply a first hydrostatic pressure to a portion of the laminate that contacts the support and second hydrostatic pressure to a portion of the laminate that does not contact the support, and
wherein the first hydrostatic pressure and the second hydrostatic pressure are different.

19. The method of manufacturing the solid state battery of claim 16, wherein in the pressing the laminate, the hydrostatic pressure applied to the portion of the laminate that does not contact the support is about 450 megapascals or greater.

20. The method of manufacturing the solid state battery of claim 16, wherein the pressure is applied by a press.

* * * * *